(12) United States Patent  (10) Patent No.: US 7,950,638 B2
Su  (45) Date of Patent: May 31, 2011

(54) FLY TYING VISE

(76) Inventor: Yungshien Vincent Su, Denver, CO (US)

( * ) Notice: Subject to any disclaimer, the term of this patent is extended or adjusted under 35 U.S.C. 154(b) by 827 days.

(21) Appl. No.: 11/974,622

(22) Filed: Oct. 15, 2007

(65) Prior Publication Data

US 2009/0020933 A1    Jan. 22, 2009

Related U.S. Application Data

(60) Provisional application No. 60/854,668, filed on Oct. 27, 2006.

(51) Int. Cl.
 *B25B 1/22* (2006.01)
 *B23Q 3/02* (2006.01)
 *B23P 5/00* (2006.01)

(52) U.S. Cl. ............... 269/71; 269/97; 269/95; 81/7

(58) Field of Classification Search ............ 269/71, 269/907, 95, 97, 98, 166, 229, 234; 81/6, 81/7, 8; 294/100
See application file for complete search history.

(56) References Cited

U.S. PATENT DOCUMENTS

| | | | |
|---|---|---|---|
| 2,586,636 A | 2/1952 | Fischer et al. | |
| 3,945,631 A | 3/1976 | Sander | |
| 4,039,178 A | 8/1977 | Odames | |
| 4,094,497 A | 6/1978 | Stratton | |
| 4,119,305 A | 10/1978 | Anderson | |
| 4,134,577 A * | 1/1979 | Price et al. ............ | 269/71 |
| 4,169,562 A | 10/1979 | Renzetti | |
| 4,184,645 A | 1/1980 | Starling | |
| 4,214,739 A | 7/1980 | Dailey | |
| 4,216,948 A | 8/1980 | Carter | |
| D263,113 S | 2/1982 | Gehrke | |
| 4,322,065 A * | 3/1982 | Doiron ............ | 269/254 R |
| 4,375,284 A | 3/1983 | Doiron | |
| 4,544,145 A | 10/1985 | Norlander | |
| D287,263 S | 12/1986 | Kojima et al. | |
| 4,969,636 A | 11/1990 | Gautam | |
| 5,165,673 A * | 11/1992 | Newton, Jr. ............ | 269/69 |
| 5,169,079 A | 12/1992 | Renzetti | |
| 5,230,177 A * | 7/1993 | Hanley ............ | 269/97 |
| 5,291,646 A | 3/1994 | French | |

(Continued)

OTHER PUBLICATIONS

U.S. Appl. No. 12/238,240, filed Sep. 25, 2008; Inventor: Yunghsien Vincent Su.

*Primary Examiner* — Lee D Wilson
*Assistant Examiner* — Alvin J Grant
(74) *Attorney, Agent, or Firm* — Margaret Polson; Oppedahl Patnent Law Firm LLC

(57) ABSTRACT

A fly tying vise to be used for holding a fishing hook and to provide rotation of the fishing hook on two axes, one axis along the center of the hook shank, the other axis perpendicular to the hook shank and the two axes cross each other. The fly tying vise has a multi-part base assembly and a bearing mechanism which will provide a lateral rotation of the jaws. While the hook holding mechanism is connected to the rotatable part of the base,
a series of elongated designed parts connected to the stationary part of the base and extended over the cylindrical center of the base assembly for holding parachute post to aid tying parachute patterns and like. The vise base can be locked in different positions laterally for using the vise as a regular rotary vise or working on a fly from different directions, such as fight handed or left handed.

2 Claims, 5 Drawing Sheets

U.S. PATENT DOCUMENTS

| | | |
|---|---|---|
| 5,537,772 A | 7/1996 | Cleveland |
| 5,716,020 A * | 2/1998 | Shults .......................... 242/443 |
| 5,775,679 A * | 7/1998 | Strub ............................. 269/75 |
| 5,785,304 A | 7/1998 | Little |
| 5,809,686 A | 9/1998 | Abby |
| 5,826,867 A | 10/1998 | Roby |
| 5,833,221 A | 11/1998 | Trunko |
| 5,884,954 A * | 3/1999 | Trozera ........................ 294/100 |
| 6,109,601 A | 8/2000 | St. John, Sr. |
| 6,119,972 A * | 9/2000 | Vogel et al. ................... 242/443 |
| 6,126,157 A | 10/2000 | Rutzer |
| 6,364,304 B1 * | 4/2002 | Strait et al. ..................... 269/71 |
| D461,520 S | 8/2002 | Olson |
| 6,564,494 B2 | 5/2003 | Renzetti |
| 7,232,119 B2 * | 6/2007 | Yonenoi .......................... 269/71 |
| 7,566,022 B1 * | 7/2009 | McKinley et al. ............ 242/446 |

* cited by examiner

FLY TYING VISE

CROSS-REFERENCE TO RELATED APPLICATIONS

This application claims benefit of Provisional Application No. 60/854,668 filed Oct. 27, 2006.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Fly tying is related to winding and fastening materials to a fishing hook to create a fly-like bait or an artificial lure. A fly tying vise is the most popular tool for securing a fishing hook for the fly tying process.

This invention relates to a fly tying vise for holding fishing hooks of various sizes and providing the function of rotating the fishing hook on two axes, one axis along the center of the hook shank and one axis perpendicular to the hook shank, and the two axes cross each other.

DISCUSSION OF PRIOR ART

There have been numerous inventions related to fly tying vises and several of them disclose the means and constructions for rotating the hook along the center of the hook shank to aid the fly tying process, such as U.S. Pat. No. 2,586,636 (Fischer), U.S. Pat. No. 4,094,497 (Stratton), U.S. Pat. No. 4,169,562 (Renzetti), U.S. Pat. No. 4,216,948 (Carter), U.S. Pat. No. 4,544,145 (Norlander), U.S. Pat. No. 5,165,673 (Newton Jr.), U.S. Pat. No. 5,169,079 (Renzetti), U.S. Pat. No. 6,119,972 (Vogel), and U.S. Pat. No. 6,364,304.

Other than the patents listed above, there are some patents claim the benefit of rotating the vise jaws laterally but none of the inventions have the function of tying flies while rotating the jaws laterally. When rotating the jaws laterally, these patents are projecting the jaws from the axis of the vertical support shaft causing the jaws ends to swivel in a wide arc or circle. None of them provides the jaws ends as a projection point from a vertical axis, such as U.S. Pat. No. 4,119,305 (Anderson), U.S. Pat. No. 4,134,577 (Price), and U.S. Pat. No. 5,826,867.

OBJECTS OF THE PRESENT INVENTION

Fly tying has existed for hundred of years and have evolved in tying materials, tying tools, and tying techniques. There are different types of fly patterns and many of them require tying materials at an axis that is perpendicular to the hook shank. One of these types of fly pattern is called a "parachute pattern". A parachute pattern consists of a "post" that is usually made from feather barbs, or other natural or synthetic materials. A fly tying person would fasten the post material to the hook shank perpendicularly and then wrap a feather onto the post causing the feather barbs tips to project from the post. The projected feather barbs will create a vertical resistance of the fly body and suspend the fly on the water surface film.

The difficulty is that the post is made from soft material which lacks lateral stiffness and it often requires practice and skills to complete the process of wrapping thread and feather onto the post.

This invention has a design that addresses the difficulties above and other difficulties with prior art fly tying vises.

SUMMARY OF THE INVENTION

In order to address the difficulties with tying parachute patterns, while traditional functions of a fly tying vise are also included, this invention has distinctive features for the base. These features consist of a stationary portion of the base; a rotary portion of the base; and a bearing mechanism to provide smooth lateral rotation. Furthermore, there are mechanisms adjoined to and extended from the base that will provide lateral support for the parachute post for a quick and easy solution for tying parachute patterns and the like.

DETAILED DESCRIPTION OF THE INVENTION

Figure 1:
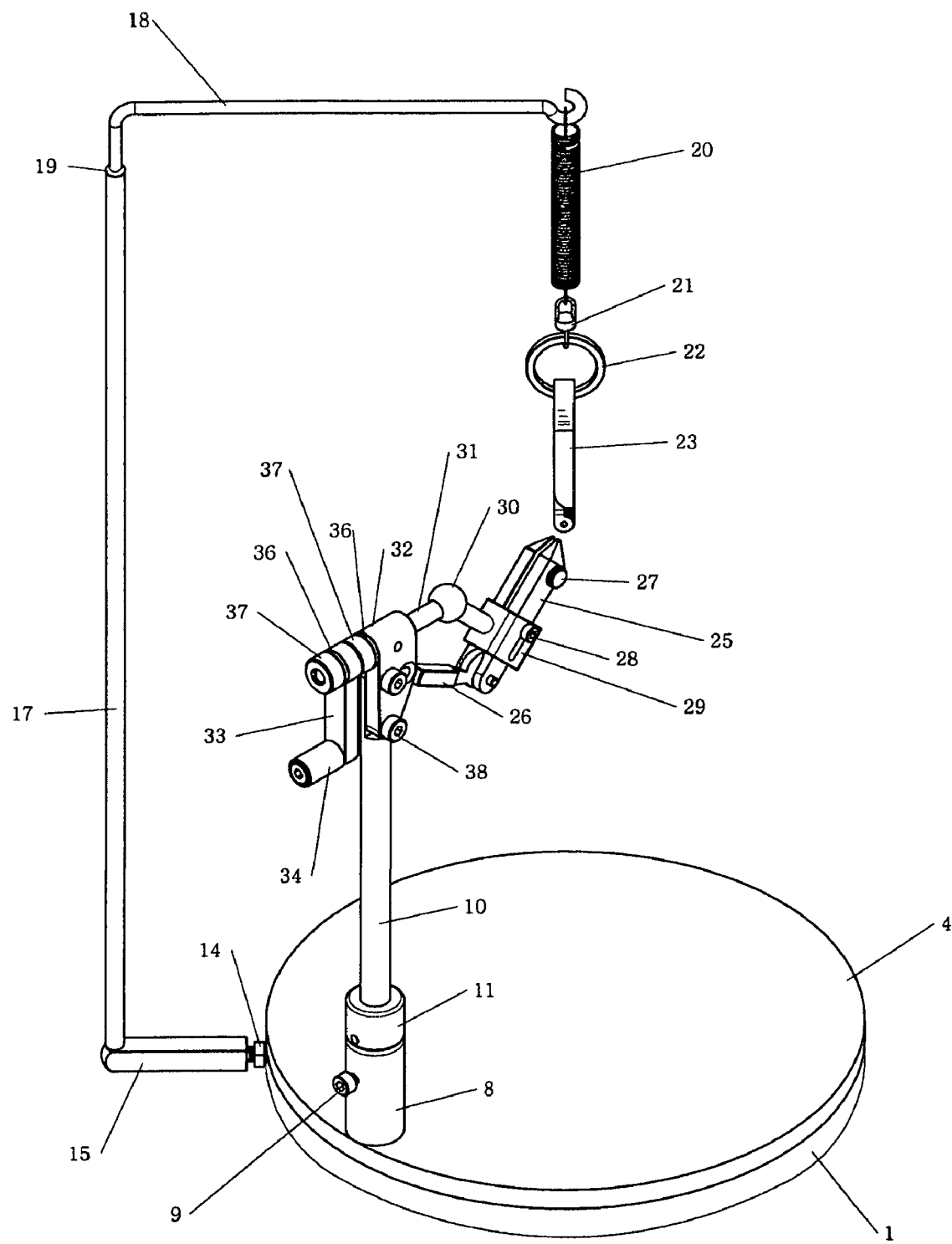
FIG. 1 is a perspective view of this invention.
Figure 2:
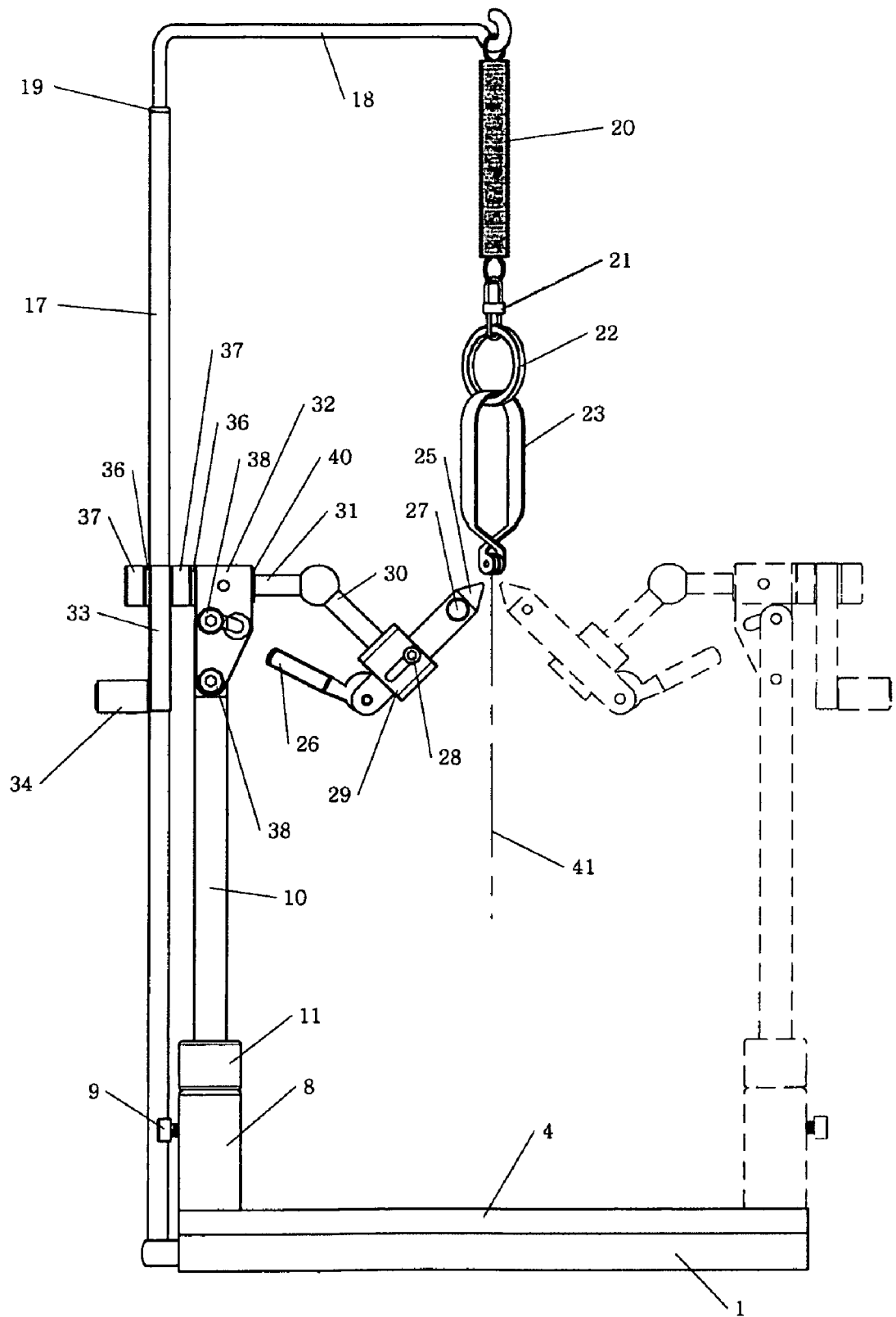
FIG. 2 is as elevated frontal view of the vise showing the lateral rotation.

FIG. 1 shows the overall features of the present invention. FIG. 2 illustrates the lateral rotation and the vise jaws, 25, relation with the vertical axis, 41.

Figure 3:
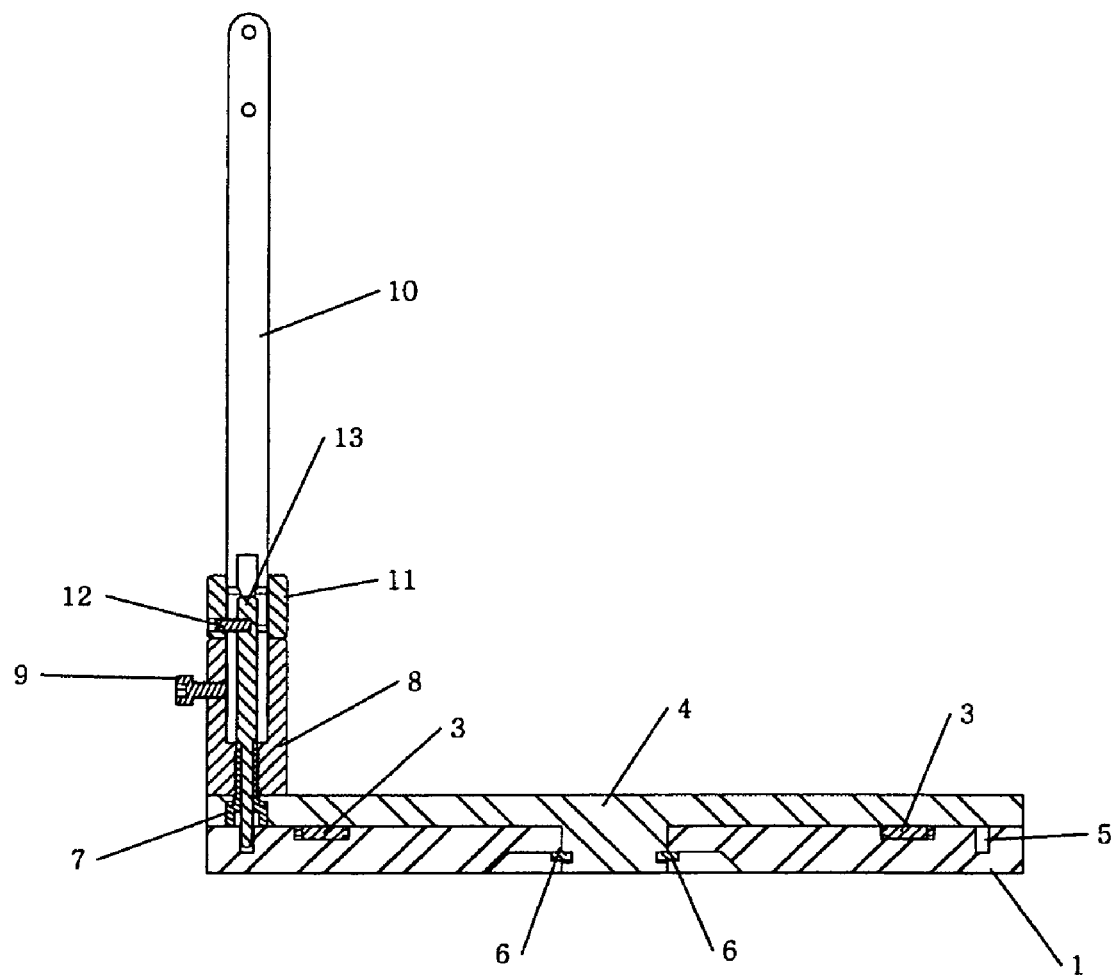
FIG. 3 is a sectional view showing the base assembly.

The present invention is best described from the bottom up. The base features can be seen and described the best from FIG. 3. The stationary part of the base, the base bottom plate, 1, is machined with a bearing groove, 2, on the top surface and can be seen in FIG. 4; a bore, 43, through the center; four pin holes, 5, on the top surface of the said base bottom plate; and a threaded hole 44, on and tangent to the cylindrical surface. The bearing grooves, 2, depth measurement is smaller than the thickness of the thrust bearing, 3, so that the top surface of the bearing is above the top surface of the base bottom plate, 1. When the rotating plate, 4, is mounted, it will rest on top of the thrust bearing that will make the rotation smooth. There is a counter bore of the rotating plate, 4, to situate a machine screw, 7, which has a bore through the length of the screw and the thread portion of the screw protrude pass the upper surface of rotating plate, 4, to be threaded into the base of a sleeve, 8. After assembling the thrust bearing, 3, the machine screw, 7, and the sleeve, 8, the rotating plate, 4, can be mounted over the base bottom plate, 1, and the thrust bearing, 3, assembly. A retaining ring, 6, is then installed over the stud portion of the rotating plate, 4, to hold the assembly together.

In order to hold a hook in a working position, the vise base needs to stop the lateral rotation. Here is a description of the locking mechanism. A shaft, 10, has a bore, 35, in the center of one end that will receive a locking pin, 13. The locking pin, 13, has one end inserted into the center of the machine screw, 7, and the rotating plate, 4. The other end of the locking pin, 13, has a threaded hole in a lateral position to receive a set screw, 12. The set screw, 12, is inserted through a sliding sleeve, 11, in a lateral position and threaded in the locking pin, 13, connecting the locking pin, 13 and the sliding sleeve, 11. The said shaft, 10, has a slot bore, 39, at a lateral position and extended the slot vertically along the shaft, 10, so that when the sliding ring, 11, is lifted, while connected to the set screw, 12, also lifted the locking pin, 13. That will unlock the rotating plate, 4, and enables the rotation function. Conversely, when the locking pin, 13, is pushed down into one of the four pin holes, 5, in the base bottom plate, 1, the vise is now in a stationary position.

Figure 4:
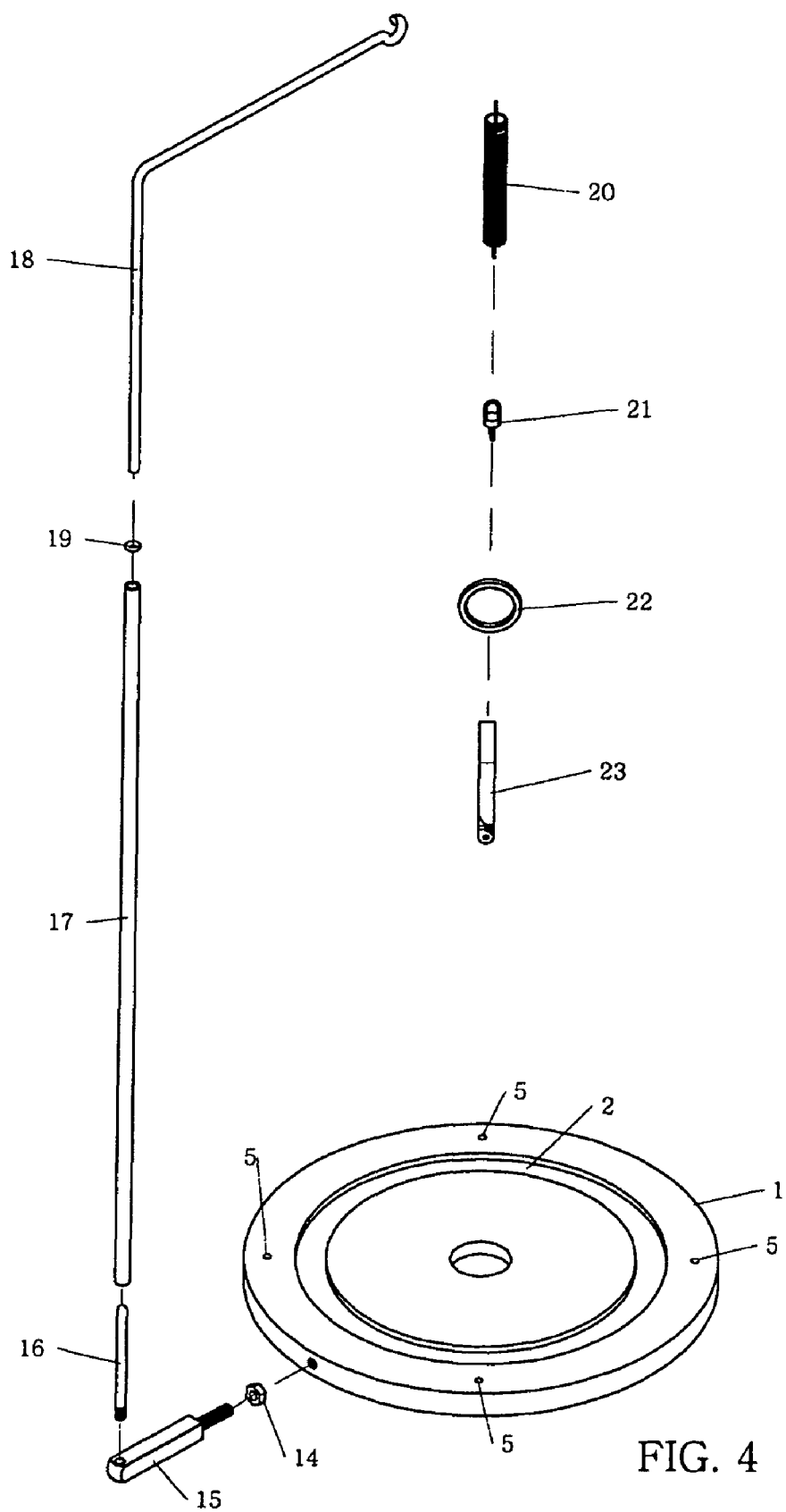
FIG. 4 is an exploded view showing the parts extended from the base bottom plate.

When working on a parachute post, a vertical support is needed to stiffen the post for easy tying motion laterally. In FIG. 4, an elongated base bracket, 15, having one end threaded for screwing into the threaded hole, 44, in base bottom plate, 1, combining a nut, 14, that can secure the said bracket to the base bottom plate, 1. On the other end of the base bracket, 15, has a threaded bore, 45, in a perpendicular position to the base bracket for screwing in a pin, 16, which will provide a lateral support for a metal tube, 17, and in turn, the said tube will support an L-shape bend arm, 18, having one end with a circular hook for holding a tension spring, 20, on one end. The other end of the tension spring, 20, connects to a swivel, 21, for providing rotation freedom from one end to the other end of the said swivel. This is a crucial part as the swivel connects to the tension spring will be stationary while the other end of the swivel connects to an adaptor ring, 22, and a hackle pliers, 23, serially. When hackle pliers, 23, is holding a parachute post and the vise is rotated laterally, the hackle pliers and the adaptor ring, 22, and one end of the swivel, 21, will follow the rotation while the other end remain stationary, so that the parachute post will not be twisted and become disengaged from the hackle pliers, 23.

Figure 5:
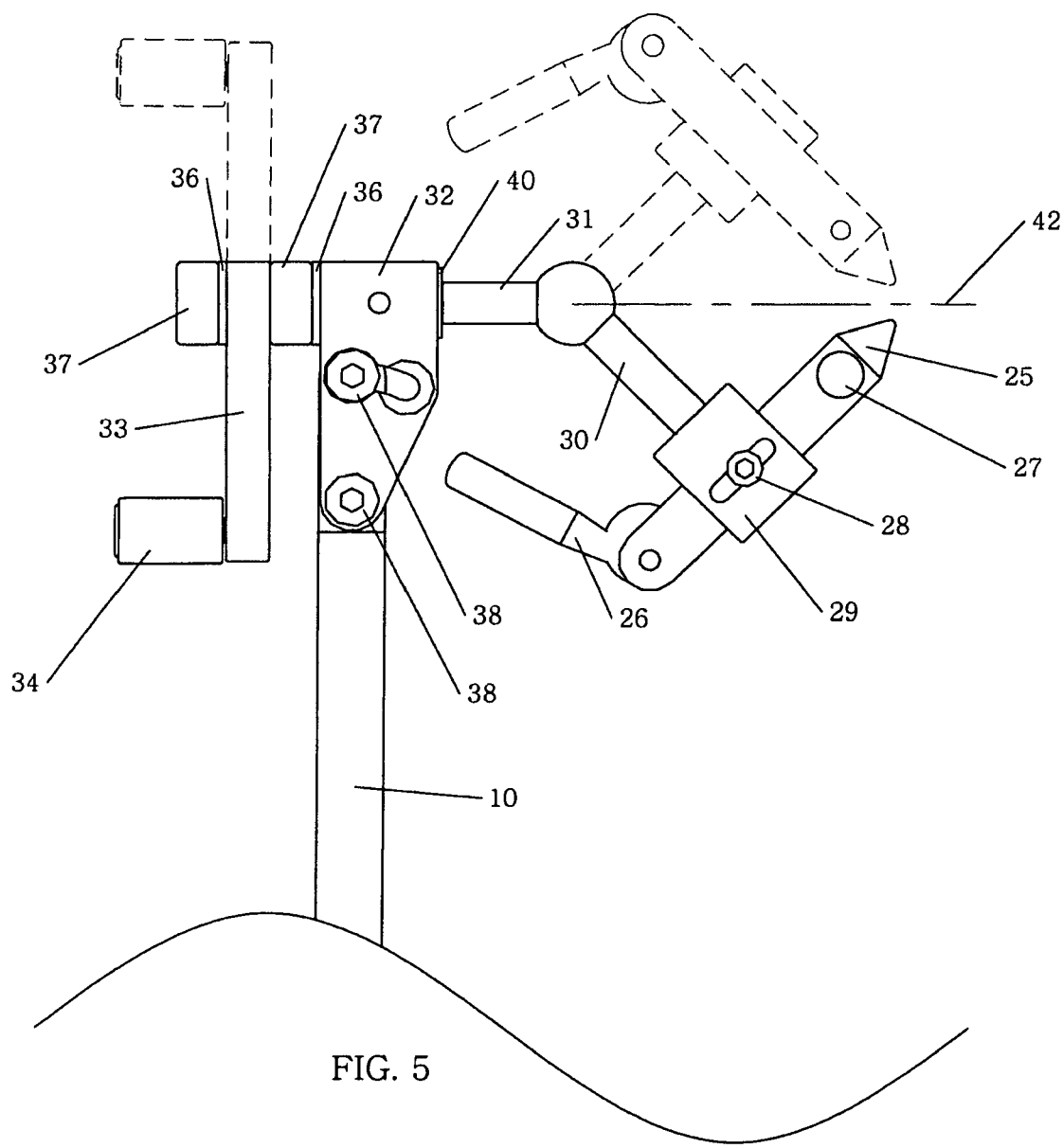
FIG. 5 is a frontal view of the hook holding mechanism and showing the rotation of the hook.

FIG. 5 illustrates this invention's fishing hook holding mechanism for tying flies as a conventional rotary fly tying vise. A fishing hook can be placed between the tips of a pair of jaws, 25. For various sizes of fishing hooks, the distance between the jaws is controlled by a thumb screw, 27, and using a cam, 26, mechanism on the other end of the jaws to lock and unlock the fishing hook. The jaws is mounted in a jaws bracket, 29, and secured by a machine screw, 28. While hook sizes varies, the slot bore, 46, in the jaws bracket, 29, provides a sliding motion for easy adjustment to the hook sizes.

In order to achieve the adjustment of the hook shank center aligned with a rotation axis, 42, the jaws, 25 are designed to have an angle from the said axis. An angle elbow, 30, has one end with a shaft; the other end has a ball joint machined with a bore in a predetermined angle from to the shaft. The angle elbows shaft is then joined to the top of the jaws bracket, 29, and the bore would be adjoined with a rotary shaft, 31. The said rotary shaft has one end pressed into the angle elbow, 30; at a predetermined distance from the end of the shaft, a groove is formed to install an E-ring, 40. The other end of the rotary shaft, 31, has a predetermined length of thread formed.

The jaws and rotary shaft assembly is then to be inserted through a joint, 32. The said joint provides the jaws vertical and horizontal support by fastening to the shaft, 10, using two machine screws, 38. The threaded portion of the said rotary shaft protrudes from the other side of the joint, 32, is then to be mounted with the following parts in order of a nylon washer, 36, a thumb nut, 37, a crank arm, 33, a nylon washer, 36, and a thumb nut, 37. The said thumb nuts have internal thread that will mate with the thread of the said rotary shaft. When applying rotation force on the thumb nuts, 37, in opposite directions, the said thumb nuts provide a holding force for the said crank arm for rotating the assembly for ultimately rotating the fishing hook.

While this invention's embodiments are clearly illustrated and disclosed above, there are alternatives and modifications can be made. It is not to be limited or restricted to the exact embodiments only. All applicable modifications may be made within the principle of the invention.

What is claimed as this invention is:

1. A fly tying vise comprising:
    a base assembly that provides a lateral rotation part of the base connected to a stationary part of the base with a thrust bearing mechanism in between;
    a vertical shaft with locking mechanism connected to the said rotate-able part of the base for supporting the hook holding means and for stopping the rotation;
    a horizontal shaft adjoined to the vertical shaft by a joint and is rotatable from its shaft center alignment, mounted a crank arm on one end, the other end connected to a predetermined-angle hole of an angle elbow;
    a jaws holding bracket having a slot cut for holding and adjusting the jaw tip position in a slanted plane and is connected to the shank of the said angle elbow;
    a cam mechanism connected to a pair of jaws which were mounted to the jaws bracket for clamping a fishing hook;
    an elongated bracket threaded to the said stationary part of the base, adjoined by a height-adjustable apparatus that extends over the center of the base from an elevated position;
    a tension mount apparatus with one end connected to the said height-adjustable apparatus and the other end having a swivel connection to a hackle pliers for holding post material;
    where by a fishing hook can be clamped and be rotated on a vertical axis or a horizontal axis and the two said axes cross each other.

2. The fly tying vise of claim 1 wherein the means for rotating the base on a vertical axis with the hook holding jaw tips projected and a tension mount apparatus from elevated position holding a parachute post providing lateral support of the said parachute post for wrapping and tying materials on a horizontal plane.

* * * * *